3,190,661
VENTED SEAL WITH STATIONARY SPACED SEALING MEMBERS
Edward C. Wahl, Arlington Heights, George Schulz, Naperville, and Raymond H. Andresen, Barrington, Ill., assignors to Gits Bros. Mfg. Co., Chicago, Ill., a corporation of Illinois
Filed Feb. 8, 1962, Ser. No. 171,973
2 Claims. (Cl. 277—75)

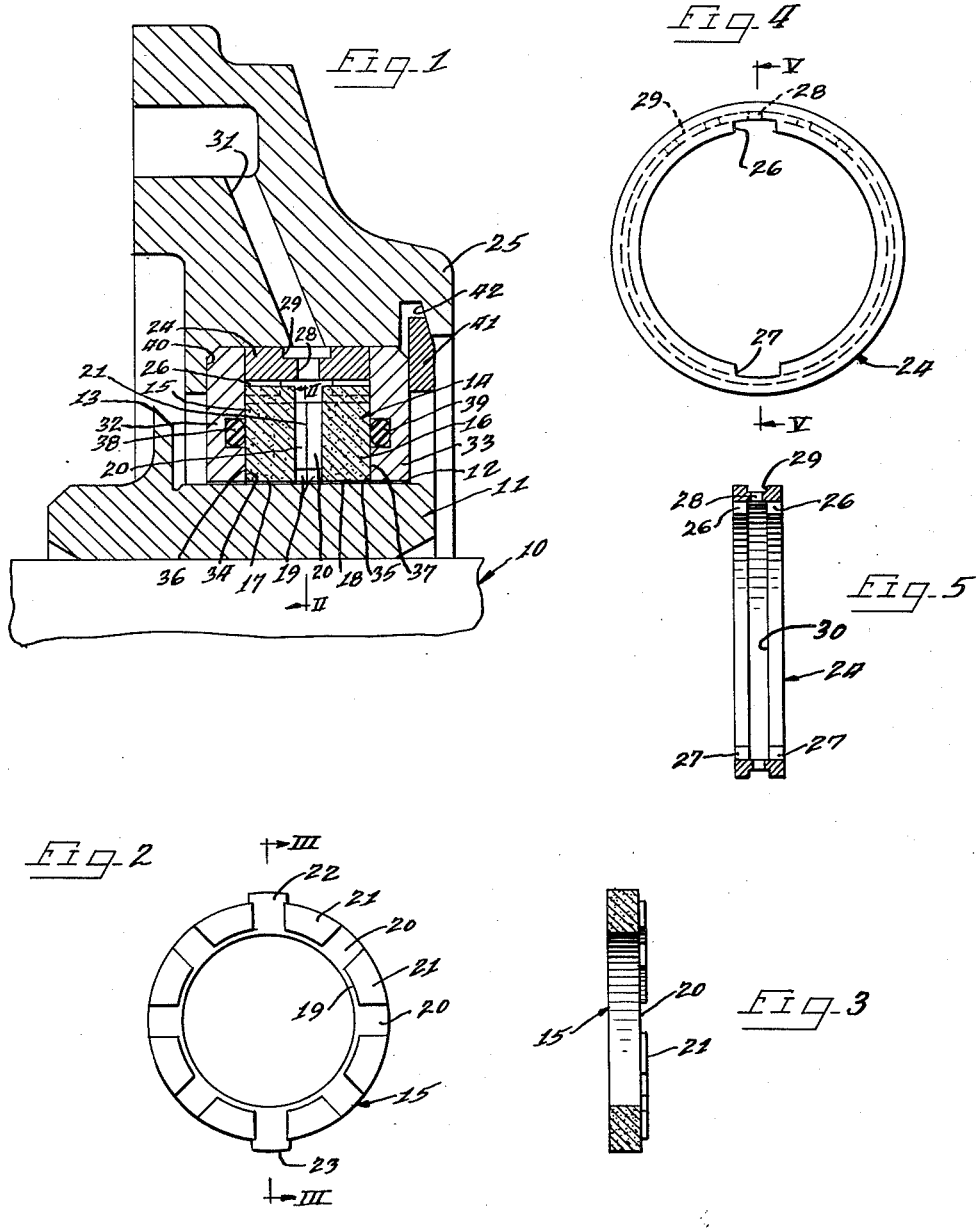

This invention relates to an improved rotary seal.

More particularly the invention relates to a seal for a rotating shaft or other rotary member in a unit which rotates at extremely high speeds and requires a minimum of space. A rotating member has a cylindrical outer surface and the escape of fluid along the surface is prevented by a sealing unit including a pair of carbon sealing rings having inner cylindrical sealing surfaces with a diameter forming a close running clearance between the ring surfaces and the rotary surface. The rings have an inner annular groove between them and have radially opening passages extending outwardly from the groove for venting fluid that leaks between the surfaces. The carbon rings are frictionally held between O-rings in holding rings and non-rotatably held by an outer ring supported in a housing.

An object of the present invention is to provide an improved seal for operating at a very high speed and for occupying a small space and sealing fluids such as a vapor mixture of air and oil.

A further object of the invention is to provide a seal wherein the sealing surfaces are in non-engaging sealing relationship and sealing rings are provided which are self-centering with respect to a rotating surface to be sealed.

A still further object of the invention is to provide a rotary seal assembly having features which allow it to be manufactured economically but permitting metal parts to be manufactured with reasonable tolerances, and in which the parts are easily assembled or disassembled.

A further object of the invention is to provide a high speed seal which has an unusually long wearing life.

Other objects, advantages and features will become more apparent with the teaching of the principles of the present invention in connection with the disclosure of the preferred embodiment thereof in the specification, claims and drawings, in which:

FIGURE 1 is a fragmentary sectional view along a section taken through the axis of a sealing structure constructed in accordance with the principles of the present invention;

FIGURE 2 is an end elevational view of a sealing ring in reduced size as compared with FIGURE 1, viewing the ring substantially along line II—II of FIGURE 1;

FIGURE 3 is a vertical sectional view taken substantially along line III—III of FIGURE 2;

FIGURE 4 is an end elevational view of an outer ring of the seal assembly of FIGURE 1, showing the ring in reduced size as compared with FIGURE 1; and FIGURE 5 is a vertical sectional view taken substantially along line V—V of FIGURE 4.

As shown on the drawings:

FIGURE 1 illustrates a seal assembly for a rotary shaft 10. Fitted on the rotary shaft to rotate therewith is a sleeve 11 with a smooth cylindrical outer surface 12 which is to be sealed to prevent fluid from passing along the shaft. The sleeve has an annular flange 13 which acts as a slinger to throw fluid outwardly and prevent it from passing directly to the surface 12 to be sealed. The surface is sealed by an annular sealing unit 14.

The sealing unit 14 includes first and second sealing rings 15 and 16 which are formed of carbon or other suitable material and which can easily be made and which will not score the outer surface 12 of the sleeve during brief engagement therewith when the rings 15 and 16 are being centered.

The rings each have an inner cylindrical sealing surface 17 and 18 which has a diameter so as to be in close running sealing clearance with the outer surface 12. The surfaces 17 and 18 are non-engaging with the surface 12 so that the surfaces are not exposed to wearing conditions. Thus the life of this seal should only only be limited by the bearings that support the rotating shaft 10. Only when the bearings wear so badly that a whip is produced in the shaft causing impact on the carbon rings by the sleeve 11 will damage be caused.

The inner diameters of the surfaces 17 and 18 are such that a sealing clearance space of a few ten thousandths of an inch is present. A preferred minimum clearance of .0020 and a maximum clearance of .0030 is maintained in manufacture. While the seal is useful in shafts of varying sizes, use is contemplated in a shaft of a small diameter on the order of one inch. The seal is capable of operating at a relatively high temperature range on the order of 350° F. and at high speeds on the order of 15,000 to 50,000 r.p.m. The seal is particularly well adapted to being used in a turbine operated blower system such as for ventilating aircraft spaces with the blower being driven by a gas turbine driven by combustion gases. At these high speeds and high temperatures ordinary lubrication is inadequate and lubrication is obtained by an oil vapor so that the present seal must be capable of preventing passage of oil vapor.

The sealing rings 15 and 16 are positioned axially adjacent each other and their inner edges are grooved to form an inwardly facing annular groove 19, FIGURES 1 and 2, which allows leakage fluid to pass outwardly through radial openings 20 formed by radially extending slots in the inner radial faces 21 of each of the rings 15 and 16. The faces 21 abut each other and the slots are positioned to match and form passages for the leakage fluid to pass outwardly.

The carbon rings are kept from rotating by two lugs 22 and 23 which provide circumferentially facing shoulders that engage rotation preventing shoulders formed by axial slots 26 and 27 in an outer ring 24, FIGURES 1, 4 and 5.

The outer ring 24 is held within a housing 25. The outer ring has an inner annular groove 30 providing side flanges in which the slots 26 and 27 are formed to provide rotation preventing shoulders.

The outer ring has radially drilled holes 28 opening into an outer annular groove 29 which communicates with a passage 31 through the housing to dump the leakage fluid, and the fluid flows overboard in the case of an aircraft seal.

The sealing rings 15 and 16 are axially positioned by holding rings 32 and 33. These rings have axially inwardly facing radial surfaces 34 and 35 respectively which face and frictionally engage axially outwardly facing surfaces 36 and 37 of the sealing rings 15 and 16. Between the surfaces are positioned annular resilient rings 38 and 39 preferably in the form of O-rings which are held in annular grooves in the surfaces 34 and 35. This arrangement yieldingly supports the sealing rings 15 and 16 in a radial direction and permits them to be automatically and immediately centered with respect to the outer cylindrical surface 12 if they have not been centered during assembly. This also permits a greater manufacturing tolerance and reduces the cost of manufacture and simplifies installation and assembly. To permit the sealing rings to move radially the outer diameter of the lugs 22 and 23 and the diameter of the notches 26 and 27 in the ring 24 are such to permit this radial shifting to obtain automatic alignment. The O-rings will prevent the leakage of fluid past the outside of the sealing rings and will help hold them frictionally.

The stacked unit is held in the housing by the holding ring 32 engaging against a shoulder 40 within the housing, and the other holding ring 33 being axially engaged by a clamping ring 41 which is in the nature of a split spring ring which expands outwardly into an annular groove 42 in the housing. Thus the holding rings also do not have to be made to a close tolerance and manufacturing deviations in axial thickness of the holding rings is compensated for by the spring clamping ring 41.

In summary, the sleeve 11 is secured on the shaft 10 and the sealing rings 15 and 16 positioned within their assembly in the housing 25 surround the sealing surface 12. The sealing rings 15 and 16 have inner sealing cylindrical surfaces 17 and 18 which do not engage the surface 12 but are in close clearance sealing relationship therewith. A minimum leakage occurs between the surfaces and fluid which does leak between the surfaces flows outwardly through the passages 20 to be dumped through the housing passage 31. As soon as the shaft 10 starts rotating, if the sealing rings are not centered, engagement with the outer surface 12 will cause them to be centered inasmuch as they are free to shift radially and are held in their centered position after being shifted. The inner diameter of the holding rings 32 and 33 is of course larger than the inner diameter of the sealing rings 15 and 16.

Thus it will be seen that we have provided an improved sealing assembly which meets the objectives and advantages above set forth, and provides a long-wearing unit capable of operation in adverse circumstances and at high speeds.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A rotary seal assembly comprising,
    a rotary member having a cylindrical rotating outer surface,
    a pair of carbon sealing rings each having an inner cylindrical surface with a non-engaging close running clearance between said inner and outer surfaces, and having annular radial axially outwardly facing surfaces,
        said rings having an inner recessed groove between them,
        and each having a portion of radial passages to coactingly form passages therebetween leading outwardly from between the rings for the escape of fluid,
    a housing surrounding the rings and having passages communicating with said ring passages for dumping fluid,
    a pair of holding rings supported in said housing having radial surfaces facing the radial surfaces of said sealing rings,
    an annular resilient ring between each sealing ring and holding ring positioned between the radial surfaces thereof to frictionally hold the sealing rings with the sealing rings being radially displaceable to be self-centering with respect to the cylindrical rotating outer surface,
    an outer ring supported in the housing having circumferentially facing shoulder means,
        said sealing rings having shoulder means engaging the shoulder means of the outer ring and preventing rotation of the sealing rings,
    and a radially outwardly expandable locking ring having a radial surface engaging the radial outer surface of one holding ring,
        said housing having a radial shoulder axially engaging a radial surface of the other holding ring,
        and said housing having an inwardly opening recess receiving said locking ring.

2. A rotary seal assembly comprising,
    a rotary member having a cylindrical rotating outer surface,
    a pair of sealing rings each having an inner cylindrical surface with a non-engaging close running clearance between said inner and outer surfaces and having radial surfaces on the outer edge of the rings,
    raised axial projections on each of the rings abutting each other with radial flow slots therebetween for the flow of fluid between said rings,
    means having axially inwardly facing side surfaces holding the rings therebetween,
    annular resilient seals between said side surfaces and the rings,
    and an outer ring surrounding the sealing rings and having radial surfaces engaging said radial surfaces of the sealing rings permitting radial shifting of the sealing rings but preventing rotation thereof.

References Cited by the Examiner

UNITED STATES PATENTS

| | | | |
|---|---|---|---|
| 2,543,615 | 2/51 | Trumpler | 277—53 XR |
| 2,723,867 | 11/55 | Howard et al. | 277—51 XR |
| 2,742,306 | 4/56 | Kelso et al. | 277—35 |
| 2,971,783 | 2/61 | Laser | 277—205 XR |
| 3,076,659 | 2/63 | Kremer | 277—157 |

EDWARD V. BENHAM, *Primary Examiner.*

SAMUEL ROTHBERG, *Examiner.*